US012704074B2

(12) United States Patent
Jalan et al.

(10) Patent No.: US 12,704,074 B2
(45) Date of Patent: Aug. 11, 2026

(54) ASPIRATING FACE SEAL ASSEMBLY FOR A ROTARY MACHINE

(71) Applicants: General Electric Company, Evendale, OH (US); General Electric Deutschland Holding GmbH, Frankfurt (DE)

(72) Inventors: Prateek Jalan, Bangalore (IN); Steven Douglas Johnson, Milford, OH (US); Rahul Anil Bidkar, Clifton Park, NY (US); Grant Robert Portune, Cincinnati, OH (US); Tajinder Singh, Bengaluru (IN); Antonio Guijarro Valencia, Munich (DE)

(73) Assignees: General Electric Company, Evendale, OH (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 19/033,918

(22) Filed: Jan. 22, 2025

(65) Prior Publication Data

US 2026/0210258 A1 Jul. 23, 2026

(51) Int. Cl.
*F01D 11/00* (2006.01)

(52) U.S. Cl.
CPC ........ *F01D 11/005* (2013.01); *F05D 2240/55* (2013.01)

(58) Field of Classification Search
CPC ... F01D 11/005; F01D 11/001; F05D 2240/55
USPC ........................................................ 415/170.1
See application file for complete search history.

(56) References Cited

U.S. PATENT DOCUMENTS

| | | | |
|---|---|---|---|
| 5,975,537 A | 11/1999 | Turnquist et al. | |
| 6,676,369 B2 | 1/2004 | Brauer et al. | |
| 6,758,477 B2 * | 7/2004 | Brauer .................. | F16J 15/164 277/379 |
| 9,291,067 B2 * | 3/2016 | Zheng .................. | F01D 11/003 |
| 10,329,938 B2 | 6/2019 | Prenger et al. | |
| 10,890,082 B2 | 1/2021 | Hardikar et al. | |
| 10,900,369 B2 | 1/2021 | Gibson et al. | |
| 11,493,135 B2 | 11/2022 | Hilbert et al. | |
| 11,624,290 B2 | 4/2023 | Gibson et al. | |

FOREIGN PATENT DOCUMENTS

CN 112161062 A 1/2021

* cited by examiner

*Primary Examiner* — Michael L Sehn
(74) *Attorney, Agent, or Firm* — Dority & Manning, P.A.

(57) ABSTRACT

An aspirating face seal assembly includes a stationary component and a seal body defining a seal face. The seal body defines a fluid feed passage within the seal body. The fluid feed passage includes an inlet, and one or more feed ports defined along the seal face. The seal body is moveably coupled to the stationary component via a resilient member. A first-pressure plenum is defined radially outward from the seal body and a second-pressure plenum is defined radially inward from the seal body. The seal assembly further includes a plenum seal forming a seal between a portion of the seal body and the stationary component and at least partially defining a third-pressure plenum in fluid communication with a high-pressure fluid source and with the inlet of the fluid feed passage. The third-pressure plenum is pressurized at a higher pressure than both the first-pressure plenum and the second-pressure plenum.

20 Claims, 7 Drawing Sheets

ASPIRATING FACE SEAL ASSEMBLY FOR A ROTARY MACHINE

FIELD

The present disclosure generally relates to a rotary machine. More particularly, the subject matter described herein relates to aspirated seal assemblies between rotating and stationary components in rotary machines.

BACKGROUND

Turbine engines, and particularly gas or combustion turbine engines, are rotary machines that extract energy from a flow of combusted gases passing through the engine onto a multitude of rotating turbine blades. The turbine engine includes a plurality of rotating parts forming a rotor assembly and a plurality of stationary parts forming a stator assembly.

Aspirating face seals are used to minimize leakage through a gap between two components, such as between the rotor assembly and the stator assembly, by restricting fluid flow from areas of higher pressure to areas of lower pressure. In addition, aspirating face seals may compensate for transient variations that may exist in gaps between these components. Fluid leakage through aspirating seal assemblies may significantly increase fuel consumption and adversely affect engine efficiency and overall efficiency of the gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
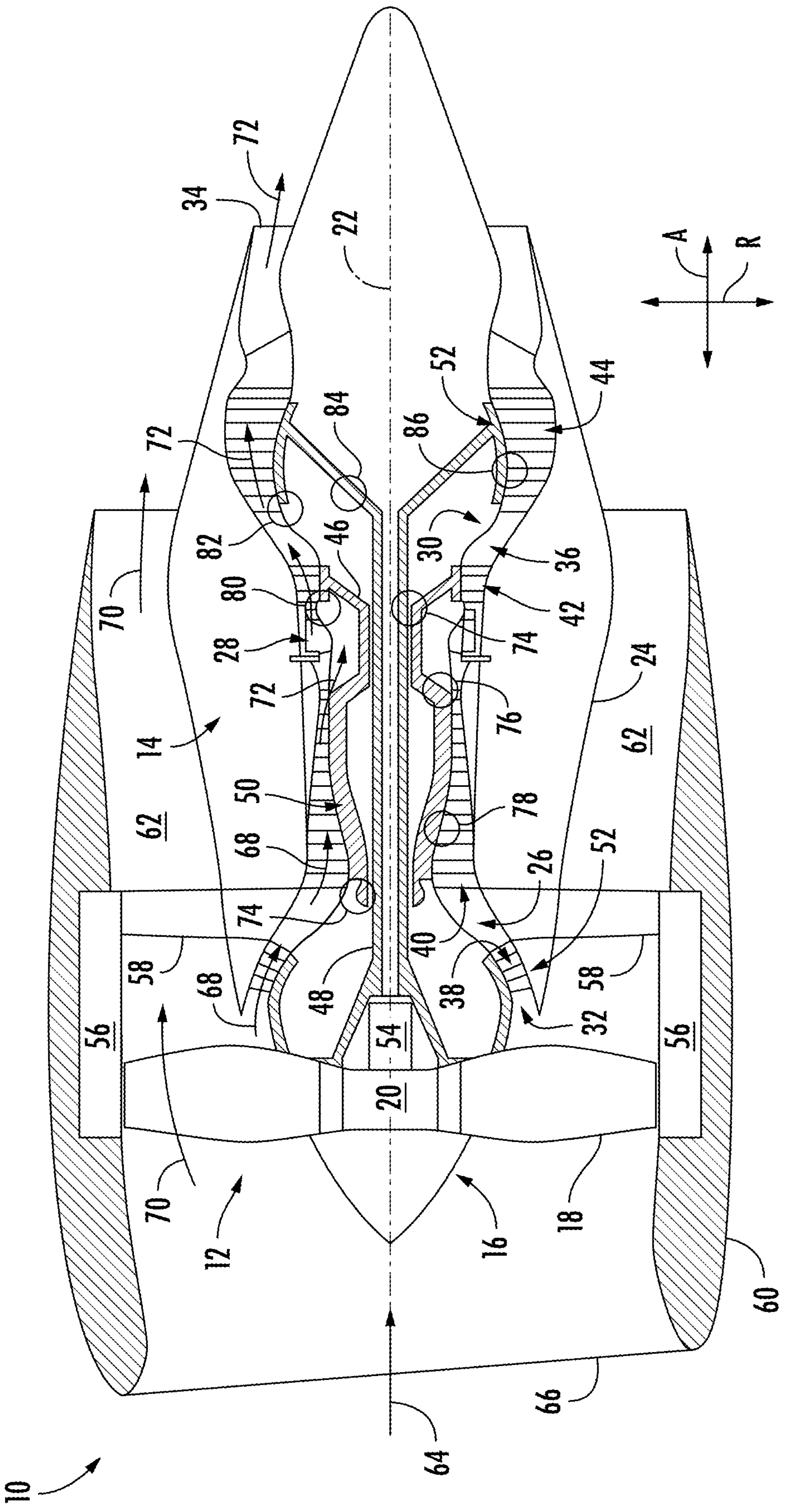
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The singular forms "a", "an", and "the" include plural references unless the context clearly dictates otherwise.

As used herein, the terms "first", "second", and "third" may be used interchangeably to distinguish one component from another and are not intended to signify location or importance of the individual components.

The term "at least one of" in the context of, e.g., "at least one of A, B, and C" refers to only A, only B, only C, or any combination of A, B, and C.

The terms "forward" and "aft" refer to relative positions within a gas turbine engine or vehicle. For example, with regards to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "plenum" refers to an air-filled space such as a cavity or volume defined within a core engine of a gas turbine engine or other rotary machine.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

Advanced air film seals operate at very low axial gaps at least in part due to air bearing stiffness generated by high pressure air that forms a curtain between a slider and rotating hardware (the slider/seal body has feed holes that 'aspirate' air and provide that stiffness to the air film). The pressure needed to achieve the increased stiffness exceeds existing seal systems.

The present disclosure is generally directed to an aspirating face seal assembly in fluid communication with a high-pressure air source which provides a flow of high-pressure air to a seal cavity defined between one or more seal ports defined along a seal face of a seal body and a seal face of a rotating component to produce an air bearing seal at an increased pressure over existing systems. The proposed design has multiple embodiments where air from the high-pressure source, such as but not limited to a TV (Turbine Vane) hub-box, supplies the high-pressure air to the air bearing, and a second sealing unit (piston ring seal, etc.) is used to separate pressure cavities surrounding the seal assembly which are held at lower pressures than the air provided by the high-pressure air source.

Referring now to the drawings, wherein identical numerals indicate the same elements throughout the figures, FIG. 1 illustrates an exemplary rotary machine configured as a gas turbine engine 10 as may incorporate various embodiments of the present disclosure. In some embodiments, the gas turbine engine 10 may be mounted to an aircraft, such as in an under-wing configuration or a tail-mounted configuration. The gas turbine engine 10 shown in FIG. 1 is provided by way of example and not to be limiting, and that the subject matter of the present disclosure may be implemented with other types of turbine engines, as well as other types of rotary machines.

In general, the gas turbine engine 10 may include a fan section 12 and a core engine 14 disposed downstream from the fan section 12. The fan section 12 may include a fan 16 with any suitable configuration, such as a variable pitch, single stage configuration. The fan 16 may include a plurality of fan blades 18 coupled to a fan disk 20 in a spaced apart manner. The plurality of fan blades 18 may extend outwardly from the fan disk 20 generally along a radial direction (R) with respect to a longitudinal centerline 22 of the gas turbine engine 10. The core engine 14 may be coupled directly or indirectly to the fan section 12 to provide torque for driving the fan section 12.

The core engine 14 may include an engine case 24 that encases one or more portions of the core engine 14, including, a compressor section 26, a combustor section 28, and a turbine section 30. The engine case 24 may at least partially define a core engine inlet 32, an exhaust nozzle 34, and a core air flowpath 36 therebetween. The core air flowpath 36 may pass through the compressor section 26, the combustor section 28, and the turbine section 30. The compressor section 26 may include a booster or low-pressure compressor 38 and a high-pressure compressor 40 disposed downstream from the low-pressure compressor 38. The turbine section 30 may include a high-pressure turbine 42 and a low-pressure turbine 44. The compressor section 26, the combustor section 28, turbine section 30, and the exhaust nozzle 34 may be arranged in serial flow relationship along the longitudinal centerline 22 and may respectively define a portion of the core air flowpath 36 through the core engine 14.

The core engine 14 and the fan section 12 may be coupled to a shaft driven by the core engine 14. By way of example, as shown in FIG. 1, the core engine 14 may include a high-pressure shaft 46 and a low-pressure shaft 48. The high-pressure shaft 46 may drivingly connect the high-pressure turbine 42 to the high-pressure compressor 40. The low-pressure shaft 48 may drivingly connect the low-pressure turbine 44 to the low-pressure compressor 38. In other embodiments, a turbine engine may have three shafts, such as in the case of a turbine engine that includes an intermediate pressure turbine. A shaft of the core engine 14, together with a rotating portion of the core engine 14, may sometimes be referred to as a "spool." The high-pressure shaft 46, a rotating portion of the high-pressure compressor 40 that is coupled to the high-pressure shaft 46, and a rotating portion of the high-pressure turbine 42 coupled to the high-pressure shaft 46, may be collectively referred to as a high-pressure spool 50. The low-pressure shaft 48, a rotating portion of the low-pressure compressor 38 coupled to the low-pressure shaft 48, and a rotating portion of the low-pressure turbine 44 coupled to the low-pressure shaft 48, may be collectively referred to as a low-pressure spool 52.

In some embodiments, the fan section 12 may be coupled directly to a shaft of the core engine 14, such as directly to the low-pressure shaft 48. Alternatively, as shown in FIG. 1, the fan section 12 and the core engine 14 may be coupled to one another by way of a power gearbox 54, such as a planetary reduction gearbox, an epicyclical gearbox, or the like. For example, the power gearbox 54 may couple the low-pressure shaft 48 to the fan 16, such as to the fan disk 20 of the fan section 12. The power gearbox 54 may include a plurality of gears for stepping down the rotational speed of the low-pressure shaft 48 to a more efficient rotational speed for the fan section 12.

Still referring to FIG. 1, the fan section 12 of the gas turbine engine 10 may include a fan case 56 that at least partially surrounds the fan 16 and/or the plurality of fan blades 18. The fan case 56 may be supported by the core engine 14, for example, by a plurality of outlet guide vanes 58 circumferentially spaced and extending substantially radially therebetween. The gas turbine engine 10 may include a nacelle 60. The nacelle 60 may be secured to the fan case 56. The nacelle 60 may include one or more sections that at least partially surround the fan section 12, the fan case 56, and/or the core engine 14. For example, the nacelle 60 may include a nose cowl, a fan cowl, an engine cowl, a thrust reverser, and so forth. The fan case 56 and/or an inward portion of the nacelle 60 may circumferentially surround an outer portion of the core engine 14. The fan case 56 and/or the inward portion of the nacelle 60 may define a bypass passage 62. The bypass passage 62 may be disposed annularly between an outer portion of the core engine 14 and the fan case 56 and/or inward portion of the nacelle 60 surrounding the outer portion of the core engine 14.

During operation of the gas turbine engine 10, an inlet airflow 64 enters the gas turbine engine 10 through an inlet 66 defined by the nacelle 60, such as by a nose cowl of the nacelle 60. The inlet airflow 64 passes across the plurality of fan blades 18. The inlet airflow 64 splits into a core airflow 68 that flows into and through the core air flowpath 36 of the core engine 14, and a bypass airflow 70 that flows through the bypass passage 62. The core airflow 68 is compressed by the compressor section 26. Pressurized air from the compressor section 26 flows downstream to the combustor section 28 where fuel is introduced to generate combustion gases 72. The combustion gases 72 exit the combustor section 28 and flow through the turbine section 30, generating torque that rotates the compressor section 26 to support combustion while also rotating the fan section 12. Rotation of the fan section 12 causes the bypass airflow 70 to flow through the bypass passage 62, generating propulsive thrust. Additional thrust is generated by the combustion gases 72 exiting the exhaust nozzle 34.

The various features and attributes of the gas turbine engine 10 described with reference to FIG. 1 are provided by way of example only and not to be limiting. In fact, the present disclosure may be implemented with respect to any turbine engine, including those with attributes or features that differ in one or more respects from the gas turbine engine 10 described herein.

Still referring to FIG. 1, the gas turbine engine 10 includes seal assemblies at a number of locations throughout the gas turbine engine 10, any one or more of which may be configured according to the present disclosure. A presently disclosed seal assembly may be provided in gas turbine engine 10 at any location that includes an interface with a rotating portion of the gas turbine engine 10, such as an interface with a rotating portion or spool of the core engine 14. For example, a seal assembly may be included at an interface with a portion of the low-pressure spool 52 and/or at an interface with the high-pressure spool 50. In some embodiments, a seal assembly may be included at an interface between a spool, such as the low-pressure spool 52 or the high-pressure spool 50, and a stationary portion of the core engine 14.

Additionally, or in the alternative, a seal assembly may be included at an interface between the low-pressure spool 52 and the high-pressure spool 50. Additionally, or in the alternative, a seal assembly may be included at an interface between a stationary portion of the core engine 14 and the low-pressure shaft 48 or the high-pressure shaft 46, and/or at an interface between the low-pressure shaft 48 and the high-pressure shaft 46.

By way of example, FIG. 1 shows some exemplary locations of a seal assembly. As one example, a seal assembly may be located at or near a bearing compartment 74. A seal assembly located at or near the bearing compartment 74 may sometimes be referred to as a bearing compartment seal. Such a bearing compartment seal may be configured to inhibit air flow, such as core airflow 68 from passing into the bearing compartment 74 of the gas turbine engine 10, such as the bearing compartment 74 located at an interface between the low-pressure shaft 48 and the high-pressure shaft 46.

As another example, a seal assembly may be located at or near the compressor section 26 of the gas turbine engine 10. In some embodiments, a seal assembly may be located at or near a compressor discharge 76, for example, of the high-pressure compressor 40. A seal assembly located at or near the compressor discharge 76 may sometimes be referred to as a compressor discharge pressure seal. Such a compressor discharge pressure seal may be configured to maintain pressure downstream of the compressor section 26 and/or to provide bearing thrust balance.

Additionally, or in the alternative, a seal assembly may be located between adjacent compressor stages 78 of the compressor section 26. A seal assembly located between adjacent compressor stages 78 may be sometimes referred to as a compressor interstage seal. Such a compressor interstage seal may be configured to limit air recirculation within the compressor section 26.

As another example, a seal assembly may be located at or near the turbine section 30 of the gas turbine engine 10. In some embodiments, a seal assembly may be located near one or both of an inlet 80 to the high-pressure turbine 42. In addition, or alternatively, a seal assembly may be located near one or both of an inlet 82 to the low-pressure turbine 44. A seal assembly located at or near inlet 80 or inlet 82 may sometimes be referred to as a forward turbine seal. Such a forward turbine seal may be configured to contain high-pressure cooling air for the high-pressure turbine 42 and/or the low-pressure turbine 44, such as for turbine disks and turbine blades thereof.

Additionally, or in the alternative, a seal assembly may be located at or near one or more turbine disk rims 84. A seal assembly located at or near the turbine disk rim 84 may sometimes be referred to as a turbine disk rim seal. Such a turbine disk rim seal may be configured to inhibit hot gas ingestion into the disk rim area.

Additionally, or in the alternative, a seal assembly may be located between adjacent turbine stages 86 of the turbine section 30. A seal assembly located between adjacent turbine stages 86 may be sometimes referred to as a turbine interstage seal. Such a turbine interstage seal may be configured to limit air recirculation within the turbine section 30.

A seal assembly at any one or more of these locations or other location of the gas turbine engine 10 may be configured in accordance with the present disclosure. Additionally, or in the alternative, the gas turbine engine 10 may include a presently disclosed seal assembly at one or more other locations of the gas turbine engine 10 without departing from the scope of the present disclosure. The presently disclosed seal assemblies may also be used in other rotary machines. The gas turbine engine 10, described with reference to FIG. 1, is provided by way of example and not to be limiting. The presently disclosed seal assemblies may be included in any rotary machine, such as the gas turbine engine 10.

Figure 2:
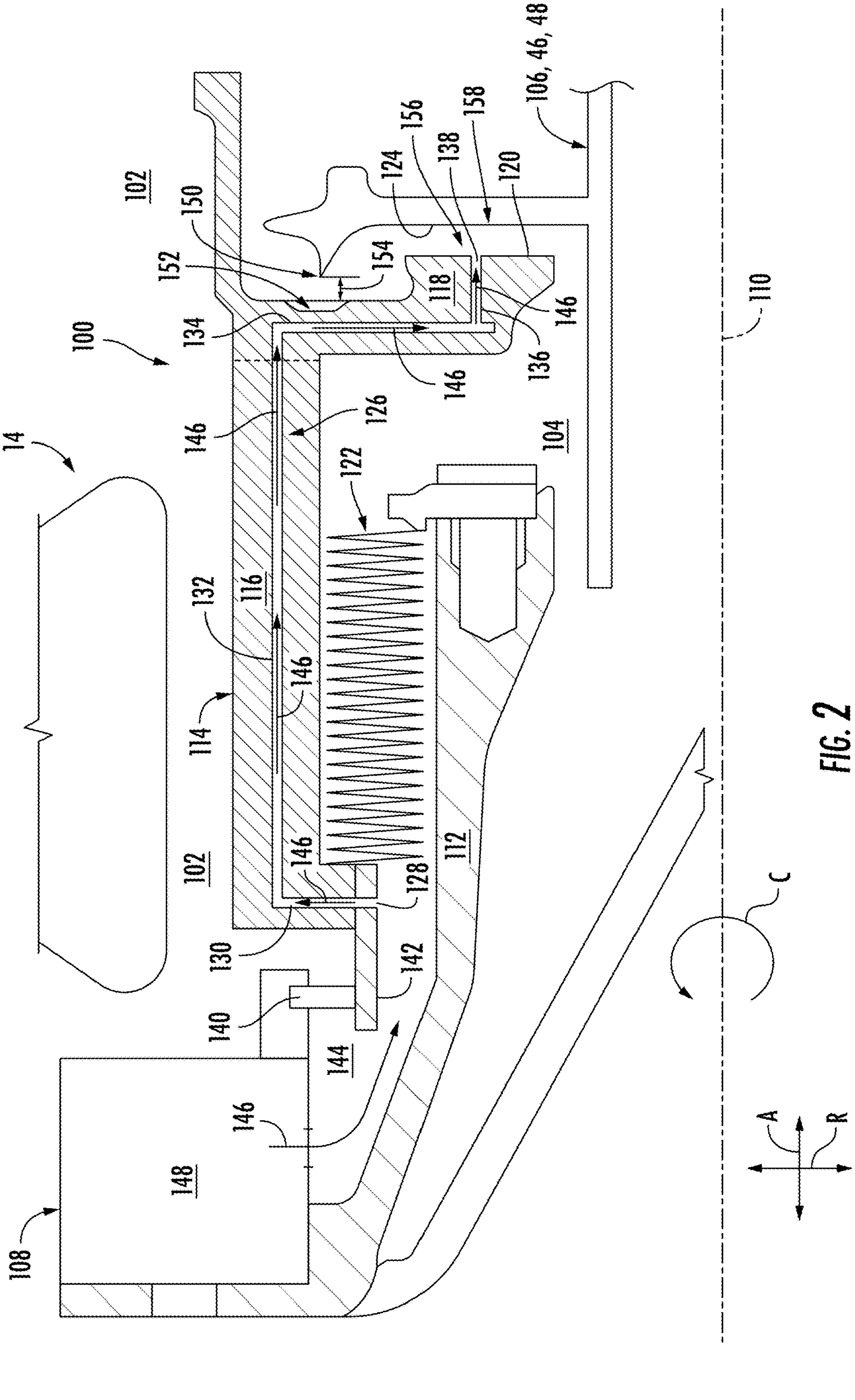
FIG. 2 illustrates a cross-sectional view of one embodiment of an aspirating face seal assembly and a portion of a core engine of the gas turbine engine shown in FIG. 1, according to at least one embodiment of the present disclosure.

FIG. 2 illustrates a cross-sectional view of one embodiment of an aspirating face seal assembly, hereinafter referred to as "seal assembly 100", and a portion of the core engine 14 shown in FIG. 1, according to at least one embodiment of the present disclosure. The seal assembly 100 is a film-riding face seal that forms a seal between a first-pressure plenum 102 (which also can be referred to as an outboard side or volume) and a second-pressure plenum 104 (which also can be referred to as an inboard side or volume) via a high-pressure fluid. In the embodiment of FIG. 2, the first-pressure plenum 102 is pressurized at a higher fluid pressure than the second-pressure plenum 104. While the description herein focuses on the first-pressure plenum 102 having greater pressure than the second-pressure plenum 104, not all embodiments are limited in this way. For example, one or more embodiments may have greater fluid pressure in the second-pressure plenum 104 and lower fluid pressure in the first-pressure plenum 102. The fluid may be compressed air or other gases, such as but not limited to combustion gases, from the core engine 14 of the gas turbine engine 10 (FIG. 1).

In the embodiment shown in FIG. 2, the seal assembly 100 forms a fluid seal between a rotating component 106 such as but not limited to the high-pressure shaft 46 or the low-pressure shaft 48 (shown in FIG. 1) and a stationary component 108 of the core engine 14. The stationary component 108 is schematically shown in FIG. 2 and may have another shape or appearance from what is shown. It is to be appreciated that part of the rotating component 106 and part of the stationary component 108 are visible in FIG. 2. The rotating component 106 rotates about or around an axis of rotation 110 such as the longitudinal centerline 22 of the gas turbine engine 10 (FIG. 1). The rotating component 106 rotates in and out of the plane of the page along a rotational or circumferential direction "C". The components shown in the cross-sectional views herein may extend entirely around the axis of rotation 110 or may be a curved segment of several segments that, when combined, extend around the axis of rotation 110.

In exemplary embodiments, the seal assembly 100 includes a stationary arm 112 that is coupled with the stationary component 108. Optionally, the stationary arm 112 may be part of (e.g., an extension of) the stationary component 108 such that the stationary arm 112 also represents the stationary component 108.

As shown in FIG. 2, the seal assembly 100 includes a seal body 114. The seal body 114 includes or defines a crossbar portion 116 and a seal arm portion 118. Seal arm portion 118 at least partially defines a seal face 120. The stationary arm 112 interfaces with the crossbar portion 116 such that the seal arm portion 118 and seal face 120 can move axially with respect to axial direction (A) towards or away from the rotating component 106. The axial direction A is along or parallel to the axis of rotation 110.

A resilient member 122 is coupled with both the stationary arm 112 and the seal body 114. In the exemplary embodiment shown in FIG. 2, the resilient member 122 is coupled at one end to the stationary arm 112 and at a second end to the crossbar portion 116. The resilient member 122 can include a spring or bellows. The resilient member 122 applies a force on the seal body 114 to hold or bias the seal face 120 toward the stationary arm 112 or stationary component 108 and away from a seal surface 124 of the rotating component 106. The stationary arm 112, and the seal body 114 can be formed as rings extending around the axis of rotation 110. The stationary arm 112 and the seal body 114 can each be a continuous ring or can be formed of segmented parts that each partially extend around the axis of rotation 110.

The seal body 114 includes or defines a fluid feed passage 126 that extends within and through at least a portion of the seal body 114. In the exemplary embodiment shown in FIG. 2, the fluid feed passage 126 includes an inlet 128 oriented radially inward towards the stationary arm 112 with respect to radial direction R. A first radial portion 130 of the fluid feed passage 126 extends in radial direction R within the crossbar portion 116 from the inlet 128 to a first axial portion 132 of the fluid feed passage 126. The first axial portion 132 extends in axial direction A within the crossbar portion 116 towards the seal arm portion 118 of the seal body 114. A second radial portion 134 of the fluid feed passage 126 extends radially inward within the seal arm portion 118 in radial direction R from the first axial portion 132. A second axial portion 136 of the fluid feed passage 126 extends in axial direction A from the second radial portion to one or more feed ports 138 or outlet(s) defined along the seal face 120. The fluid feed passage 126 provides or defines a continuous flowpath through the seal body 114 between the inlet 128 and the one or more feed ports 138.

In exemplary embodiments, the seal assembly 100 may further include a plenum seal 140. In the embodiment illustrated in FIG. 2, the plenum seal 140 may be disposed between a portion of the seal body 114 and a portion of the stationary component 108 thereby forming a seal therebetween. The plenum seal 140 may be a piston seal. In the embodiment shown in FIG. 2, the plenum seal 140, an outer surface 142 of the seal body 114, the stationary component 108, and the stationary arm 112 at least partially define a third-pressure plenum 144 therebetween. The third-pressure plenum 144 receives fluid 146 at high-pressure from a high-pressure fluid source 148 of the core engine 14. For example, the high-pressure fluid source 148 may include one or more of the high-pressure compressor 40, and the high-pressure turbine 42. Fluid 146 is provided to the third-pressure plenum at a greater pressure than both the first-pressure plenum 102 and the second-pressure plenum 104. The third-pressure plenum 144 is in fluid communication with the inlet 128 to the fluid feed passage 126. In this configuration, the fluid feed passage 126 defines a continuous flowpath from the third-pressure plenum 144 to the one or more feed ports 138.

In operation, the resilient member 122 pulls or otherwise biases the seal body 114, particularly the seal face 120, toward the stationary component 108 and away from the seal surface 124 of the rotating component 106. Fluid pressure from the first-pressure plenum 102 can urge or force the seal body 114, particularly the seal face 120 toward the seal surface 124 of the rotating component 106 (e.g., in the axial direction A and opposite to the direction in which the resilient member 122 pulls the seal body 114) because an increased fluid pressure is formed in the first-pressure plenum 102 that is higher than fluid pressure in the second-pressure plenum 104.

As the seal body 114 moves toward the rotating component 106, a primary tooth 150 of the rotating component 106 moves close to a secondary sealing surface 152 of the seal body 114, thus reducing an axial gap 154 through which fluid can move from the first-pressure plenum 102 to the second-pressure plenum 104. The fluid allowed to pass through the axial gap forms a film bearing or seal between the primary tooth 150 and the secondary sealing surface 152 of the seal body 114. This bearing or seal can prevent or reduce leakage of fluid from the first-pressure plenum 102 operating at a higher fluid pressure to the second-pressure plenum 104 operating at a lower pressure as compared to the first-pressure plenum.

The fluid 146 flows from the third-pressure plenum 144, into the fluid feed passage 126 via inlet 128, travels through the fluid feed passage 126 and out through the one or more feed ports 138 into a fluid cavity 156 defined between the seal face 120 of the seal body 114 and the seal surface 124 of the rotating component 106. Fluid 146 forms an axial fluid film bearing 158 between the seal face 120 of the seal body 114 and the seal surface 124 of the rotating component 106. An axial thickness of this axial fluid film bearing 158 is shown in an exaggerated size in FIG. 1. The axial thickness may be on the order of three to six mils, in one embodiment. Alternatively, the thickness may be smaller than three mils or larger than six mils. The axial separation between the secondary sealing surface 152 of the seal body 114 and the primary tooth 150 can be reduced such that a seal is formed between the seal body 114 and the rotating component 106 at the interface between the secondary sealing surface 152 and the primary tooth 150.

Figure 3:
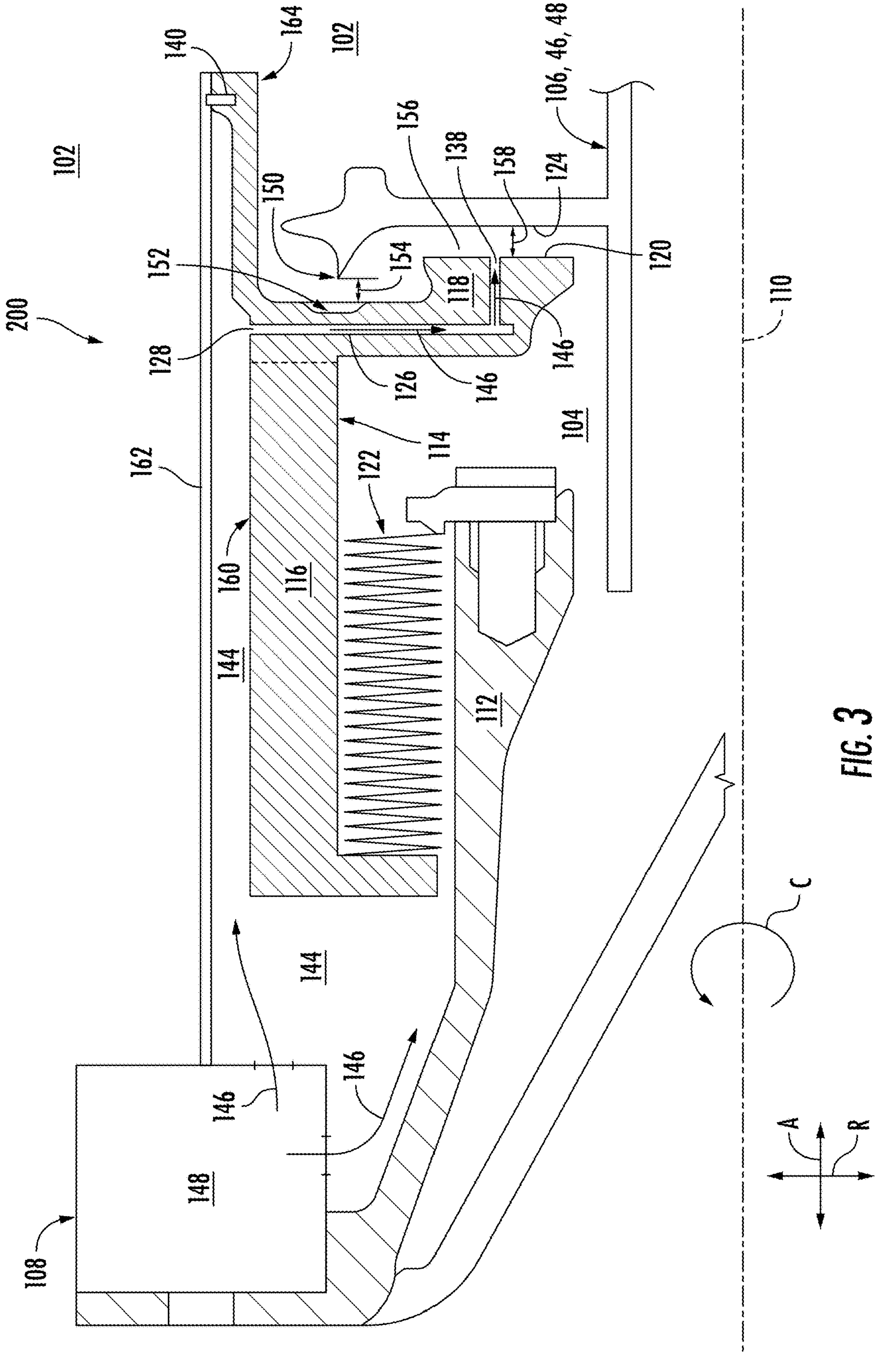
FIG. 3 illustrates a cross-sectional view of another embodiment of the aspirating face seal assembly shown in FIG. 2, according to at least one embodiment of the present disclosure.

FIG. 3 illustrates a cross-sectional view of another embodiment of an aspirating face seal assembly, hereinafter referred to as "seal assembly 200", according to at least one embodiment of the present disclosure. As shown in FIG. 3, the aspirating face seal assembly 200 has similar components, which are similarly labeled, as the seal assembly 100 shown in FIG. 2. As with seal assembly 100 in FIG. 2, seal assembly 200, illustrated in FIG. 3, is a film-riding face seal that forms a seal between the first-pressure plenum 102 and the second-pressure plenum 104 via a high-pressure fluid.

In the embodiment shown in FIG. 3, the first-pressure plenum 102 is pressurized at a higher fluid pressure than the second-pressure plenum 104. While the description herein focuses on the first-pressure plenum 102 having greater pressure than the second-pressure plenum 104, not all embodiments are limited in this way. For example, one or more embodiments may have greater fluid pressure in the second-pressure plenum 104 and lower fluid pressure in the first-pressure plenum 102. The fluid may be compressed air or other gases from the core engine 14 of the gas turbine engine 10 (FIG. 1).

As shown in FIG. 3, the seal assembly 200 forms a fluid seal between the rotating component 106 such as but not limited to the high-pressure shaft 46 or the low-pressure shaft 48 (shown in FIG. 1) and the stationary component 108 of the core engine 14. The seal assembly 200 includes the stationary arm 112 that is coupled to the stationary component 108. Optionally, the stationary arm 112 may be part of (e.g., an extension of) the stationary component 108 such that the stationary arm 112 also represents the stationary component 108.

As shown in FIG. 3, the seal assembly 200 includes the seal body 114. The seal body 114 includes or defines the crossbar portion 116 and the seal arm portion 118. The seal arm portion 118 at least partially defines the seal face 120. The stationary arm 112 interfaces with the crossbar portion 116 such that the seal arm portion 118 and seal face 120 can move axially with respect to axial direction A towards or away from the rotating component 106. The axial direction A is along or parallel to the axis of rotation 110.

The resilient member 122 may be coupled with both the stationary arm 112 and the seal body 114. In the exemplary embodiment shown in FIG. 3, the resilient member 122 is coupled at one end to the stationary arm 112 and at a second end to the crossbar portion 116. The resilient member 122 can include a spring or bellows. The resilient member 122 applies a force on the seal body 114 to hold or bias the seal face 120 toward the stationary arm 112 or stationary component 108 and away from the seal surface 124 of the rotating component 106. The stationary arm 112, and the seal body 114 can be formed as rings extending around the axis of rotation 110. The stationary arm 112 and the seal body 114 can each be a continuous ring or can be formed of segmented parts that each partially extend around the axis of rotation 110.

As shown in FIG. 3, the seal body 114 includes or defines a fluid feed passage 126 that extends within and through at least a portion of the seal body 114. In the exemplary embodiment shown in FIG. 3, inlet 128 is disposed along a radially outer surface 160 of the seal body 114 and is oriented radially outward away the stationary arm 112 with respect to radial direction R. For example, the inlet 128 may be disposed at or proximate to the seal arm portion 118 portion of the seal body 114. The fluid feed passage 126 extends radially inward from the inlet 128 towards the axis of rotation 110 to one or more feed ports 138 defined along the seal face 120. The fluid feed passage 126 provides or defines a continuous flowpath through the seal body 114 between the inlet 128 and the one or more feed ports 138 to the seal face 120.

As shown in FIG. 3, the seal assembly 200 further includes the plenum seal 140. The plenum seal 140 may be disposed between the radially outer surface 160 of the seal body 114 oriented radially outward from the axis of rotation 110, and a portion of the stationary component 108 thereby forming a seal therebetween. The portion of the stationary component 108 may comprise a stationary extension arm 162 coupled to or formed integrally (e.g., formed as a singular body) with the stationary component 108. The stationary extension arm 162 is disposed radially outward from the radially outer surface 160 of the seal body 114. The plenum seal 140 may be slidingly engaged with the stationary extension arm 162. In the configuration shown in FIG. 3, the plenum seal 140 may be disposed proximate to an end portion 164 of the seal body 114. End portion 164 is distal from the stationary component 108. In exemplary embodiments, the plenum seal 140 may be a piston seal. In the embodiment shown in FIG. 3, the plenum seal 140, the radially outer surface 160 of the seal body 114, the stationary arm 112, and the stationary extension arm 162 at least partially define the third-pressure plenum 144.

In operation, the third-pressure plenum 144 receives fluid 146 at high-pressure from a high-pressure fluid source 148 of the core engine 14. For example, the high-pressure fluid source 148 may include one or more of the high-pressure compressor 40, and the high-pressure turbine 42, both shown in FIG. 1. Fluid 146 is provided to the third-pressure plenum 144 at a greater pressure than both the first-pressure plenum 102 and the second-pressure plenum 104. The third-pressure plenum 144 is in fluid communication with the inlet 128 to the fluid feed passage 126.

The resilient member 122 pulls or otherwise biases the seal body 114, particularly the seal face 120, toward the stationary component 108 and away from the seal surface 124 of the rotating component 106. Fluid pressure from the third-pressure plenum 144 can urge or force the seal body 114, particularly the seal face 120 toward the seal surface 124 of the rotating component 106 (e.g., in the axial direction A and opposite to the direction in which the resilient member 122 pulls the seal body 114) because an increased fluid pressure is formed in the third-pressure plenum 144 that is higher than fluid pressure in the second-pressure plenum 104 and the first-pressure plenum 102.

As the seal body 114 moves toward the rotating component 106, the primary tooth 150 of the rotating component 106 moves close to the secondary sealing surface 152 of the seal body 114, thus reducing axial gap 154 through which fluid can move from the first-pressure plenum 102 to the second-pressure plenum 104. The fluid allowed to pass through the axial gap 154 forms a film bearing or seal between the primary tooth 150 and the secondary sealing surface 152 of the seal body 114. This bearing or seal can prevent or reduce leakage of fluid from the first-pressure plenum 102 operating at a higher fluid pressure to the second-pressure plenum 104 operating at a lower pressure as compared to the first-pressure plenum.

The fluid 146 flows from the third-pressure plenum 144, into the fluid feed passage 126 via inlet 128, travels through the fluid feed passage 126 and out through the one or more feed ports 138 into the fluid cavity 156 defined between the seal face 120 of the seal body 114 and the seal surface 124 of the rotating component 106. Fluid 146 forms an axial fluid film bearing 158 between the seal face 120 of the seal body 114 and the seal surface 124 of the rotating component 106. An axial thickness of this axial fluid film bearing 158 may be on the order of three to six mils, in one embodiment. Alternatively, the thickness may be smaller than three mils or larger than six mils. The axial separation between the secondary sealing surface 152 of the seal body 114 and the primary tooth 150 can be reduced such that a seal is formed between the seal body 114 and the rotating component 106 at the interface between the secondary sealing surface 152 and the primary tooth 150.

Figure 4:
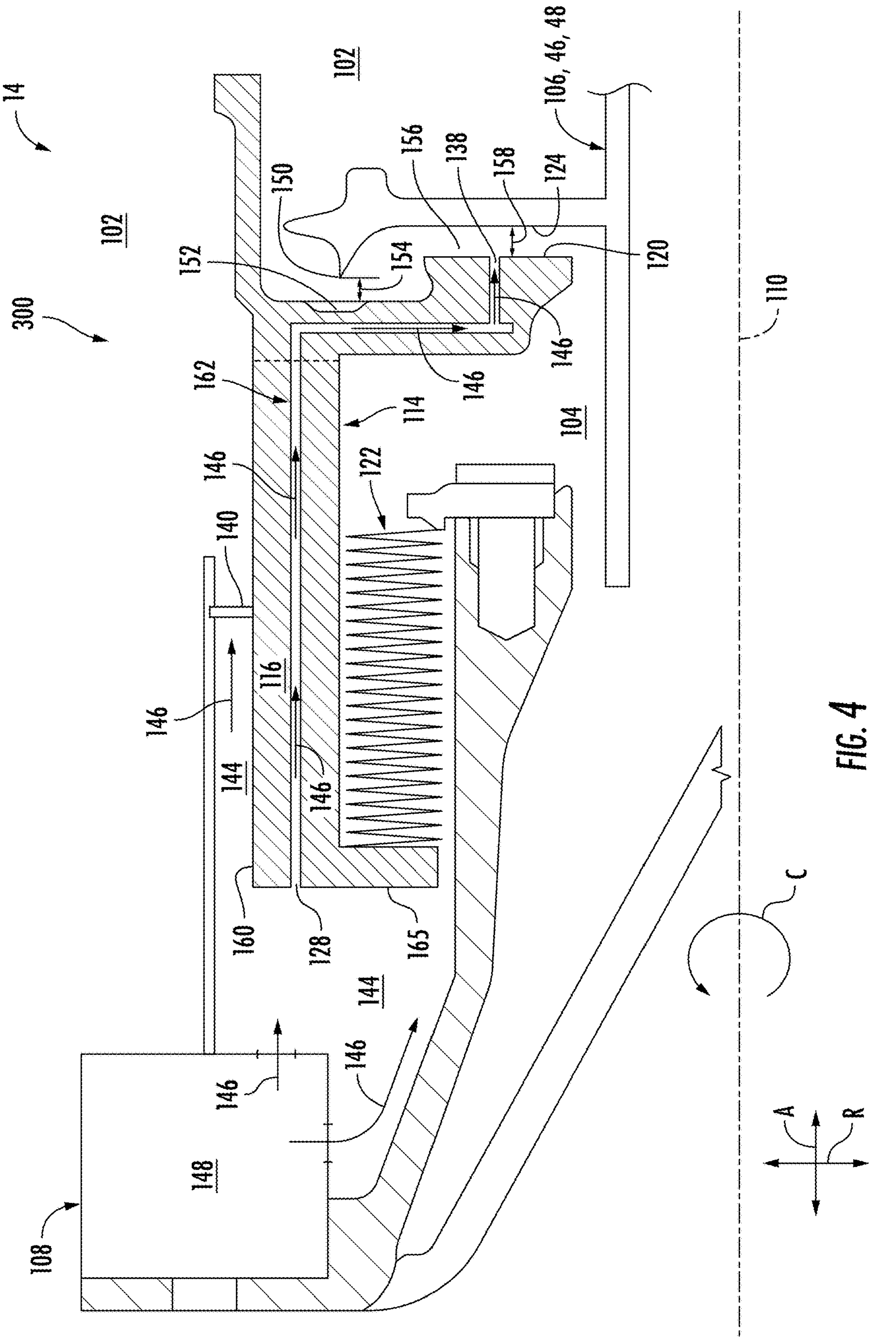
FIG. 4 illustrates a cross-sectional view of an alternate embodiment of the aspirating face seal assembly as shown in FIG. 3, according to at least one embodiment of the present disclosure.

FIG. 4 illustrates a cross-sectional view of another embodiment of an aspirating face seal assembly, hereinafter referred to as "seal assembly 300", according to at least one embodiment of the present disclosure. The embodiment of FIG. 4 has similar components, which are similarly labeled, as the seal assembly 100 shown in FIG. 2. In addition, the embodiment of seal assembly 300 is similar to the embodiment of seal assembly 200 shown in FIG. 3, with the exception of the location of the plenum seal 140 and the inlet 128 to the fluid feed passage 126.

As shown in FIG. 4, the seal body 114 includes or defines a fluid feed passage 126 that extends within and through at least a portion of the seal body 114. For example, the fluid feed passage 126 extends in axial direction A through the crossbar portion 116 and in radial direction R within the seal arm portion 118 of the seal body 114. The inlet 128 is defined along a radially extending or radial side wall 165 of the crossbar portion 116 portion of the seal body 114. The fluid feed passage 126 provides or defines a continuous flowpath through the seal body 114 between the inlet 128 and the one or more feed ports 138 to the seal face 120.

The plenum seal 140 is disposed between the radially outer surface 160 of the seal body 114 oriented radially outward from the axis of rotation 110, and a portion of the stationary component 108 thereby forming a seal therebetween. In the embodiment shown in FIG. 4, the portion of the stationary component 108 comprises the stationary extension arm 162 coupled to or formed integrally (e.g., formed as a singular body) with the stationary component 108. The stationary extension arm 162 is disposed radially outward from the radially outer surface 160 of the seal body 114. The plenum seal 140 may be slidingly engaged with the stationary extension arm 162. In the configuration shown in FIG. 4, the plenum seal 140 is disposed along the crossbar portion 116 of the seal body 114. The plenum seal 140 may be a piston seal. In the embodiment shown in FIG. 4, the plenum seal 140, the radially outer surface 160 of the seal body 114, the stationary arm 112, and the stationary extension arm 162 at least partially define the third-pressure plenum 144.

In operation, the third-pressure plenum 144 receives fluid 146 at high-pressure from a high-pressure fluid source 148 of the core engine 14. For example, the high-pressure fluid source 148 may include one or more of the high-pressure compressor 40, and the high-pressure turbine 42, both shown in FIG. 1. Fluid 146 is provided to the third-pressure plenum 144 at a greater pressure than both the first-pressure plenum 102 and the second-pressure plenum 104. The third-pressure plenum 144 is in fluid communication with the inlet 128 to the fluid feed passage 126.

The resilient member 122 pulls or otherwise biases the seal body 114, particularly the seal face 120, toward the stationary component 108 and away from the seal surface 124 of the rotating component 106. Fluid pressure from the third-pressure plenum 144 can urge or force the seal body 114, particularly the seal face 120 toward the seal surface 124 of the rotating component 106 (e.g., in the axial direction A and opposite to the direction in which the resilient member 122 pulls the seal body 114) because an increased fluid pressure is formed in the third-pressure plenum 144 that is higher than fluid pressure in the second-pressure plenum 104 and the first-pressure plenum 102.

As the seal body 114 moves toward the rotating component 106, the primary tooth 150 of the rotating component 106 moves close to the secondary scaling surface 152 of the seal body 114, thus reducing an axial gap 154 through which fluid can move from the first-pressure plenum 102 to the second-pressure plenum 104. The fluid allowed to pass through the axial gap 154 forms a film bearing or seal between the primary tooth 150 and the secondary sealing surface 152 of the seal body 114. This bearing or seal can prevent or reduce leakage of fluid from the first-pressure plenum 102 operating at a higher fluid pressure, to the second-pressure plenum 104 operating at a lower pressure as compared to the first-pressure plenum.

The fluid 146 flows from the third-pressure plenum 144, into the fluid feed passage 126 via inlet 128, travels through the fluid feed passage 126 and out through the one or more feed ports 138 into the fluid cavity 156 defined between the seal face 120 of the seal body 114 and the seal surface 124 of the rotating component 106. Fluid 146 forms the axial fluid film bearing 158 between the seal face 120 of the seal body 114 and the seal surface 124 of the rotating component 106. An axial thickness of this axial fluid film bearing 158 may be on the order of three to six mils, in one embodiment. Alternatively, the thickness may be smaller than three mils or larger than six mils. The axial separation between the secondary sealing surface 152 of the seal body 114 and the primary tooth 150 can be reduced such that a seal is formed between the seal body 114 and the rotating component 106 at the interface between the secondary sealing surface 152 and the primary tooth 150.

Figure 5:
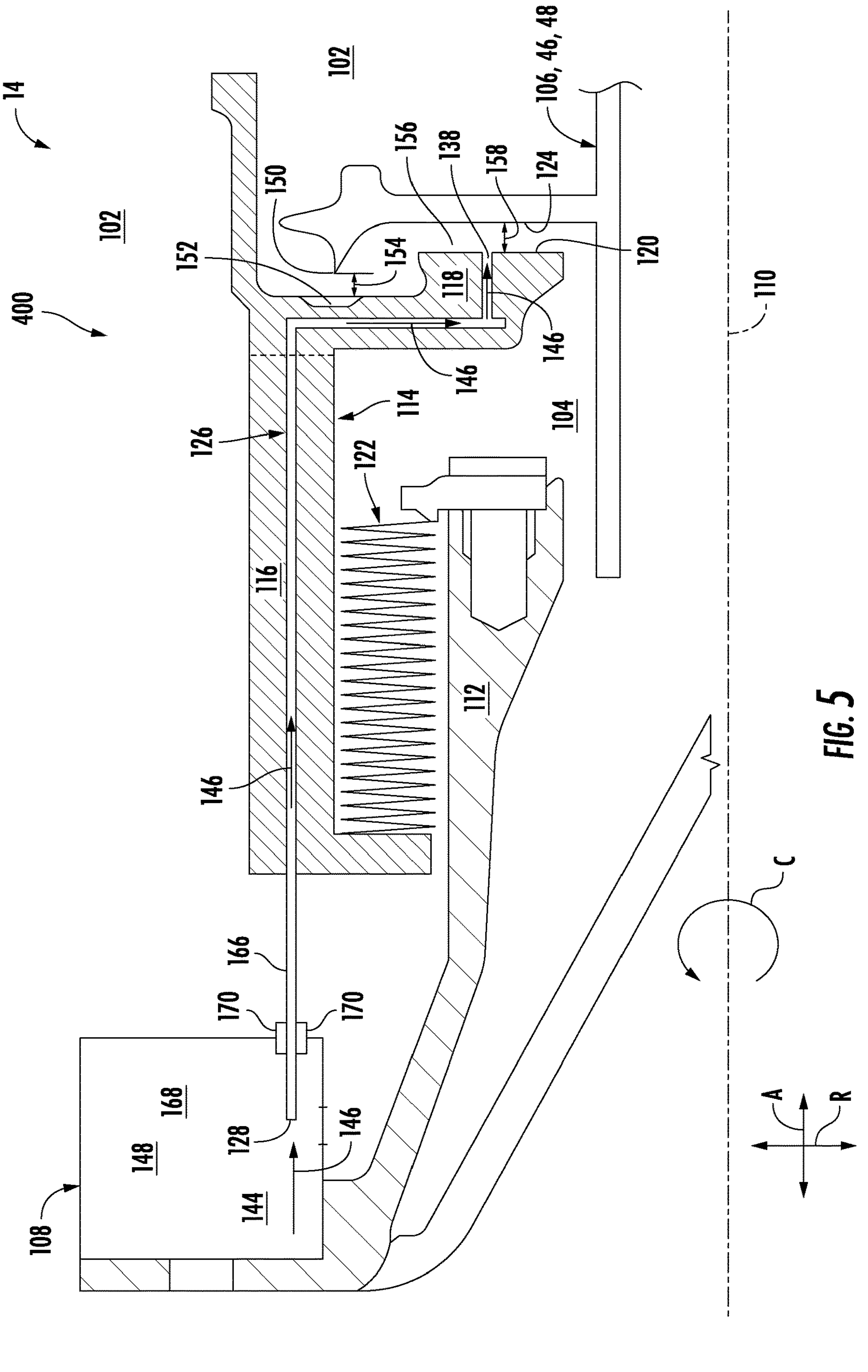
FIG. 5 illustrates a cross-sectional view of another embodiment of the aspirating face seal assembly shown in FIG. 2, according to at least one embodiment of the present disclosure.

FIG. 5 illustrates a cross-sectional view of another embodiment of an aspirating face seal assembly, hereinafter referred to as "seal assembly 400", according to at least one embodiment of the present disclosure. The seal assembly 400 shown in FIG. 5 has similar components to the seal assembly 100 shown in FIG. 2, which are similarly labeled. As with seal assembly 100, seal assembly 400 is a film-riding face seal that forms a seal between the first-pressure plenum 102 (which also can be referred to as an outboard side or volume) and the second-pressure plenum 104 (which also can be referred to as an inboard side or volume) via a high-pressure fluid.

In the embodiment of FIG. 5, the first-pressure plenum 102 is pressurized at a higher fluid pressure than the second-pressure plenum 104. While the description herein focuses on the first-pressure plenum 102 having greater pressure than the second-pressure plenum 104, not all embodiments are limited in this way. For example, one or more embodiments may have greater fluid pressure in the second-pressure plenum 104 and lower fluid pressure in the first-pressure plenum 102. The fluid may be compressed air or other gases from the core engine 14 of the gas turbine engine 10 (FIG. 1).

As shown in FIG. 5, the seal assembly 400 forms a fluid seal between the rotating component 106 such as but not limited to the high-pressure shaft 46 or the low-pressure shaft 48 (shown in FIG. 1) and the stationary component 108 of the core engine 14. The stationary component 108 is schematically shown in FIG. 5 and may have another shape or appearance from what is shown. Part of the rotating component 106 and part of the stationary component 108 are visible in FIG. 5. The rotating component 106 rotates about or around the axis of rotation 110 such as the longitudinal centerline 22 of the gas turbine engine 10 (FIG. 1). The rotating component 106 rotates in and out of the plane of the page along a rotational or circumferential direction "C". The components shown in the cross-sectional views herein may extend entirely around the axis of rotation 110 or may be a curved segment of several segments that, when combined, extend around the axis of rotation 110.

Seal assembly 400 includes the stationary arm 112 that is coupled with the stationary component 108. Optionally, the stationary arm 112 may be part of (e.g., an extension of) the stationary component 108 such that the stationary arm 112 also represents the stationary component 108. As shown in FIG. 5, the seal assembly 400 includes the seal body 114.

The seal body 114 includes or defines the crossbar portion 116 and the seal arm portion 118. The seal arm portion 118 at least partially defines the seal face 120. The stationary arm 112 interfaces with the crossbar portion 116 such that the seal arm portion 118 and seal face 120 can move axially with respect to axial direction A towards or away from the rotating component 106. The axial direction A is along or parallel to the axis of rotation 110.

The resilient member 122 may be coupled with both the stationary arm 112 and the seal body 114. In the exemplary embodiment shown in FIG. 5, the resilient member 122 is coupled at one end to the stationary arm 112 and at a second end to the crossbar portion 116. The resilient member 122 can include a spring or bellows. The resilient member 122 applies a force on the seal body 114 to hold or bias the seal face 120 toward the stationary arm 112 or stationary component 108 and away from the seal surface 124 of the rotating component 106. The stationary arm 112, and the seal body 114 can be formed as rings extending around the axis of rotation 110. The stationary arm 112 and the seal body 114 can each be a continuous ring or can be formed of segmented parts that each partially extend around the axis of rotation 110.

As shown in FIG. 5, the seal body 114 includes or defines a fluid feed passage 126 that extends within and through at least a portion of the seal body 114. In the embodiment shown in FIG. 5, the fluid feed passage 126 is at least partially defined by a tube 166 that extends from the seal body 114, and into the high-pressure fluid source 148 or a plenum 168 at least partially defined by the stationary component 108 and in fluid communication with the high-pressure fluid source 148. The tube 166 defines the inlet 128 to the fluid feed passage 126. The fluid feed passage 126, including the tube 166, provides or defines a continuous flowpath from the high-pressure fluid source 148, through the seal body 114 to the one or more feed ports 138, and on to the seal face 120.

As shown in FIG. 5, the tube 166 may be slidably engaged with one or more plenum seals 170 which provide a seal between an outer surface of the tube 166 and the high-pressure fluid source 148, the stationary component 108 or plenum 168. In exemplary embodiments, the one or more plenum seals 170 may be piston seal(s). In the embodiment shown, the third-pressure plenum 144 is at least partially defined by plenum 168.

In operation, the third-pressure plenum 144 or plenum 168 receives fluid 146 at high-pressure from the high-pressure fluid source 148 of the core engine 14. For example, the high-pressure fluid source 148 may include one or more of the high-pressure compressor 40, and the high-pressure turbine 42, both shown in FIG. 1. Fluid 146 is provided to the third-pressure plenum 144 or plenum 168 at a greater pressure than both the first-pressure plenum 102 and the second-pressure plenum 104. The third-pressure plenum 144 or plenum 168 is in fluid communication with the tube 166 and the fluid feed passage 126 via the inlet 128.

The resilient member 122 pulls or otherwise biases the seal body 114, particularly the seal face 120, toward the stationary component 108 and away from the seal surface 124 of the rotating component 106. Fluid pressure from the third-pressure plenum 144 or plenum 168 can urge or force the seal body 114, particularly the seal face 120 toward the seal surface 124 of the rotating component 106 (e.g., in the axial direction A and opposite to the direction in which The resilient member 122 pulls or otherwise biases the seal body 114) because an increased fluid pressure is formed in the third-pressure plenum 144 or plenum 168 that is higher than fluid pressure in the second-pressure plenum 104 and the first-pressure plenum 102.

As the seal body 114 moves toward the rotating component 106, the primary tooth 150 of the rotating component 106 moves close to the secondary sealing surface 152 of the seal body 114, thus reducing an axial gap 154 through which fluid can move from the first-pressure plenum 102 to the second-pressure plenum 104. The fluid allowed to pass through the axial gap forms a film bearing or seal between the primary tooth 150 and the secondary sealing surface 152 of the seal body 114. This bearing or seal can prevent or reduce leakage of fluid from the first-pressure plenum 102 operating at a higher fluid pressure to the second-pressure plenum 104 operating at a lower pressure as compared to the first-pressure plenum.

The fluid 146 from the high-pressure fluid source 148 is at a fluid pressure that is higher than both the fluid pressure in the first-pressure plenum 102 and in the second-pressure plenum 104. The fluid 146 flows from the third-pressure plenum 144, into the fluid feed passage 126 via inlet 128 and the tube 166, travels through the fluid feed passage 126 and out through the one or more feed ports 138 into the fluid cavity 156 defined between the seal face 120 of the seal body 114 and the seal surface 124 of the rotating component 106. Fluid 146 forms the axial fluid film bearing 158 between the seal face 120 of the seal body 114 and the seal surface 124 of the rotating component 106. An axial thickness of the axial fluid film bearing 158 may be on the order of three to six mils, in one embodiment. Alternatively, the thickness may be smaller than three mils or larger than six mils. The axial separation between the secondary sealing surface 152 of the seal body 114 and the primary tooth 150 can be reduced such that a seal is formed between the seal body 114 and the rotating component 106 at the interface between the secondary sealing surface 152 and the primary tooth 150.

Figure 6:
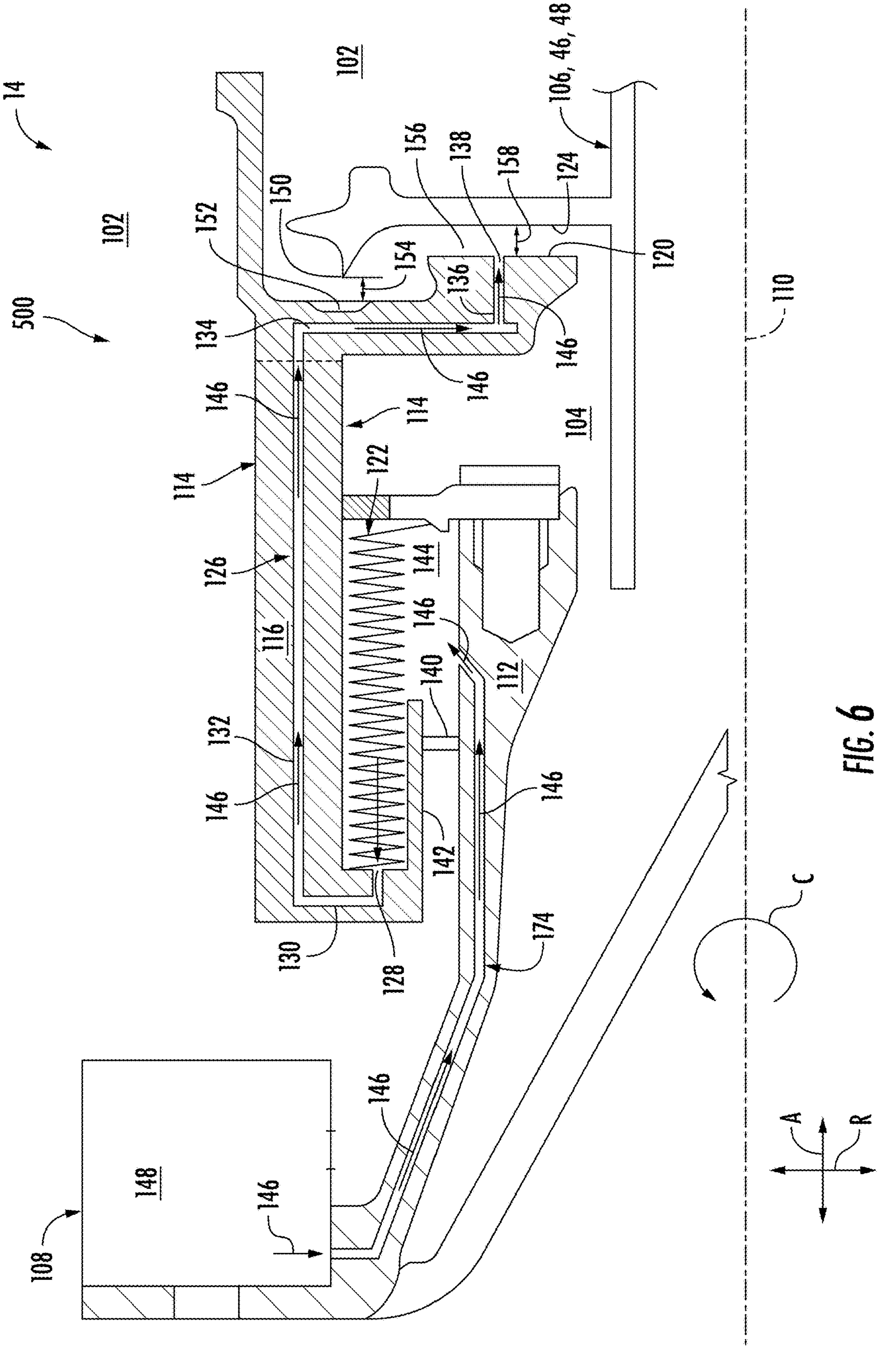
FIG. 6 illustrates a cross-sectional view of another embodiment of the aspirating face seal assembly shown in FIG. 2, according to at least one embodiment of the present disclosure.

FIG. 6 illustrates a cross-sectional view of another embodiment of an aspirating face seal assembly, hereinafter referred to as "seal assembly 500", according to at least one embodiment of the present disclosure. The seal assembly 500 shown in FIG. 6 has similar components to the seal assembly 100 shown in FIG. 2, which are similarly labeled. As with seal assembly 100, seal assembly 500 is a film-riding face seal that forms a seal between the first-pressure plenum 102 and the second-pressure plenum 104 via a high-pressure fluid. In the embodiment of FIG. 6, the first-pressure plenum 102 is pressurized at a higher fluid pressure than the second-pressure plenum 104. While the description herein focuses on the first-pressure plenum 102 having greater pressure than the second-pressure plenum 104, not all embodiments are limited in this way. For example, one or more embodiments may have greater fluid pressure in the second-pressure plenum 104 and lower fluid pressure in the first-pressure plenum 102. The fluid may be compressed air or other gases from the core engine 14 of the gas turbine engine 10 (FIG. 1).

As shown in FIG. 6, seal assembly 500 forms a fluid seal between the rotating component 106 such as but not limited to the high-pressure shaft 46 or the low-pressure shaft 48 (shown in FIG. 1) and the stationary component 108 of the core engine 14. The stationary component 108 is schematically shown in FIG. 6 and may have another shape or appearance from what is shown. Only part of the rotating component 106 and part of the stationary component 108 are visible in FIG. 6. The rotating component 106 rotates about or around the axis of rotation 110 such as the longitudinal centerline 22 of the gas turbine engine 10 (FIG. 1). The rotating component 106 rotates in and out of the plane of the page along rotational or circumferential direction "C". The components shown in the cross-sectional views herein may extend entirely around the axis of rotation 110 or may be a curved segment of several segments that, when combined, extend around the axis of rotation 110.

As shown in FIG. 6, seal assembly 500 includes the stationary arm 112 that is coupled with the stationary component 108. Optionally, the stationary arm 112 may be part of (e.g., an extension of) the stationary component 108 such that the stationary arm 112 also represents the stationary component 108.

Seal assembly 500 includes the seal body 114. The seal body 114 includes or defines the crossbar portion 116 and seal arm portion 118. The seal arm portion 118 at least partially defines the seal face 120. The stationary arm 112 interfaces with the crossbar portion 116 such that the seal arm portion 118 and seal face 120 can move axially with respect to axial direction A towards or away from the rotating component 106. The axial direction A is along or parallel to the axis of rotation 110.

The resilient member 122 is coupled with both the stationary arm 112 and the seal body 114. In the exemplary embodiment shown in FIG. 6, the resilient member 122 is coupled at one end to the stationary arm 112 and at a second end to the crossbar portion 116. The resilient member 122 can include a spring or bellows. In the embodiment shown in FIG. 6, the resilient member 122 is at least partially disposed within or surrounded by an inner pocket 172 at least partially defined by the seal body 114.

The resilient member 122 applies a force on the seal body 114 to hold or bias the seal face 120 toward the stationary arm 112 or stationary component 108 and away from a seal surface 124 of the rotating component 106. The stationary arm 112, and the seal body 114 can be formed as rings extending around the axis of rotation 110. The stationary arm 112 and the seal body 114 can each be a continuous ring or can be formed of segmented parts that each partially extend around the axis of rotation 110.

As shown in FIG. 6, the seal body 114 includes or defines a fluid feed passage 126 that extends within and through at least a portion of the seal body 114. The fluid feed passage 126 includes inlet 128 oriented axially towards the resilient member 122 with respect to axial direction A. The first radial portion 130 of the fluid feed passage 126 extends in radial direction R within the crossbar portion 116 from the inlet 128 to the first axial portion 132 of the fluid feed passage 126. The first axial portion 132 extends in axial direction A within the crossbar portion 116 towards the seal arm portion 118. The second radial portion 134 of the fluid feed passage 126 extends within the seal arm portion 118 in radial direction R from the first axial portion 132 towards the rotating component 106. The second axial portion 136 of the fluid feed passage 126 extends in axial direction A from the second radial portion to one or more feed ports 138 or outlet(s) defined along the seal face 120. The fluid feed passage 126 provides or defines a continuous flowpath through the seal body 114 between the inlet 128 and the one or more feed ports 138.

As shown in FIG. 6, seal assembly 500 may further include plenum seal 140. In the embodiment illustrated, the plenum seal 140 is disposed between a portion of the seal body 114 and a portion of the stationary arm 112 thereby forming a seal therebetween. In exemplary embodiments, the plenum seal 140 may be a piston seal. In this embodiment, the plenum seal 140, the inner pocket 172 of the seal body 114, and the stationary arm 112 at least partially define the third-pressure plenum 144.

The third-pressure plenum 144 receives fluid 146 at high-pressure from the high-pressure fluid source 148 of the core engine 14 via a channel 174 defined within or at least partially by the stationary arm 112. The high-pressure fluid source 148 may include one or more of the high-pressure compressor 40, and the high-pressure turbine 42. Fluid 146 is provided to the third-pressure plenum at a greater pressure than both the first-pressure plenum 102 and the second-pressure plenum 104. The third-pressure plenum 144 is in fluid communication with the inlet 128 to the fluid feed passage 126. In this configuration, the fluid feed passage 126 defines a continuous flowpath from the third-pressure plenum 144 to the one or more feed ports 138.

In operation, The resilient member 122 pulls or otherwise biases the seal body 114, particularly the seal face 120, toward the stationary component 108 and away from the seal surface 124 of the rotating component 106. Fluid pressure from the first-pressure plenum 102 can urge or force the seal body 114, particularly the seal face 120 toward the seal surface 124 of the rotating component 106 (e.g., in the axial direction A and opposite to the direction in which the resilient member 122 pulls the seal body 114) because an increased fluid pressure is formed in the first-pressure plenum 102 that is higher than fluid pressure in the second-pressure plenum 104.

As the seal body 114 moves toward the rotating component 106, primary tooth 150 of the rotating component 106 moves close to the secondary sealing surface 152 of the seal body 114, thus reducing an axial gap 154 through which fluid can move from the first-pressure plenum 102 to the second-pressure plenum 104. The fluid allowed to pass through the axial gap 154 forms a film bearing or seal between the primary tooth 150 and the secondary sealing surface 152 of the seal body 114. This bearing or seal can prevent or reduce leakage of fluid from the first-pressure plenum 102 operating at a higher fluid pressure to the second-pressure plenum 104 operating at a lower pressure as compared to the first-pressure plenum.

The fluid 146 from the high-pressure fluid source 148 flows through the channel 174 and into the third-pressure plenum 144 at a fluid pressure that is higher than both the fluid pressure in the first-pressure plenum 102 and in the second-pressure plenum 104. The fluid 146 flows from the third-pressure plenum 144, into the fluid feed passage 126 via inlet 128, travels through the fluid feed passage 126 and out through the one or more feed ports 138 into fluid cavity 156 defined between the seal face 120 of the seal body 114 and the seal surface 124 of the rotating component 106. Fluid 146 forms the axial fluid film bearing 158 between the seal face 120 of the seal body 114 and the seal surface 124 of the rotating component 106. An axial thickness of this axial fluid film bearing 158 may be on the order of three to six mils, in one embodiment. Alternatively, the thickness may be smaller than three mils or larger than six mils. The axial separation between the secondary sealing surface 152 of the seal body 114 and the primary tooth 150 can be reduced such that a seal is formed between the seal body 114 and the rotating component 106 at the interface between the secondary sealing surface 152 and the primary tooth 150.

Figure 7:
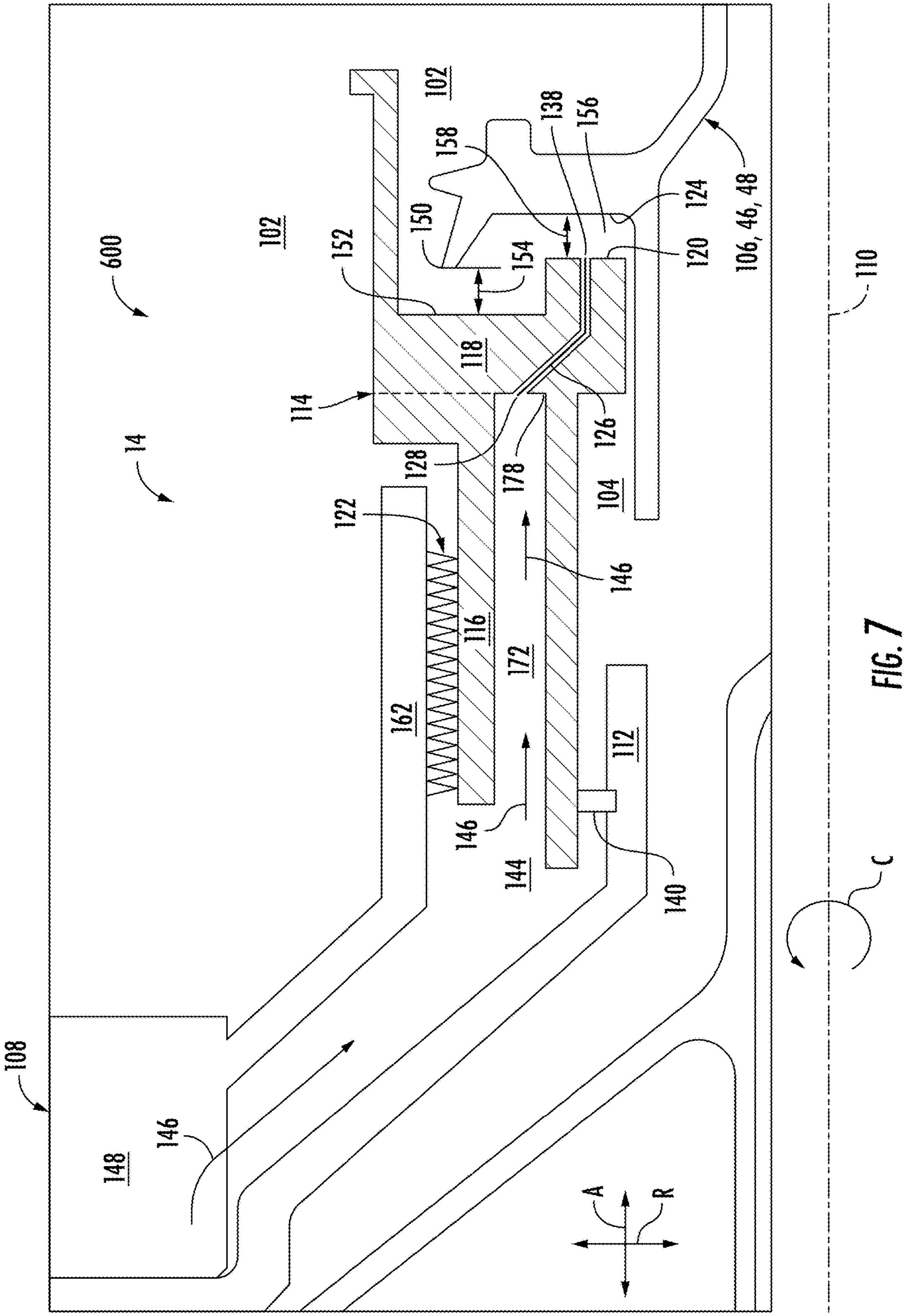
FIG. 7 illustrates a cross-sectional view of another embodiment of the aspirating face seal assembly shown in FIG. 2, according to at least one embodiment of the present disclosure.

FIG. 7 illustrates a cross-sectional view of another embodiment of an aspirating face seal assembly, hereinafter referred to as "seal assembly 600", according to at least one embodiment of the present disclosure. The seal assembly 600 shown in FIG. 7 has similar components to the seal assembly 100 shown in FIG. 2, which are similarly labeled.

As with seal assembly 100, seal assembly 600 is a film-riding face seal that forms a seal between the first-pressure plenum 102 and the second-pressure plenum 104 via a high-pressure fluid. In the embodiment of FIG. 7, the first-pressure plenum 102 is pressurized at a higher fluid pressure than the second-pressure plenum 104. While the description herein focuses on the first-pressure plenum 102 having greater pressure than the second-pressure plenum 104, not all embodiments are limited in this way. For example, one or more embodiments may have greater fluid pressure in the second-pressure plenum 104 and lower fluid pressure in the first-pressure plenum 102. The fluid may be compressed air or other gases from the core engine 14 of the gas turbine engine 10 (FIG. 1).

As shown in FIG. 7, seal assembly 600 forms a fluid seal between the rotating component 106 such as but not limited to the high-pressure shaft 46 or the low-pressure shaft 48 (shown in FIG. 1) and the stationary component 108 of the core engine 14. The stationary component 108 is schematically shown in FIG. 7 and may have another shape or appearance from what is shown. Only part of the rotating component 106 and part of the stationary component 108 are visible in FIG. 7. The rotating component 106 rotates about or around the axis of rotation 110 such as the longitudinal centerline 22 of the gas turbine engine 10 (FIG. 1). The rotating component 106 rotates in and out of the plane of the page along rotational or circumferential direction “C”. The components shown in the cross-sectional views herein may extend entirely around the axis of rotation 110 or may be a curved segment of several segments that, when combined, extend entirely around the axis of rotation 110.

As shown in FIG. 7, seal assembly 600 includes the stationary arm 112 that is coupled with the stationary component 108. Optionally, the stationary arm 112 may be part of (e.g., an extension of) the stationary component 108 such that the stationary arm 112 also represents the stationary component 108.

Seal assembly 600 includes the seal body 114. The seal body 114 includes or defines the crossbar portion 116 and seal arm portion 118. The seal arm portion 118 at least partially defines the seal face 120. The stationary arm 112 interfaces with the crossbar portion 116 such that the seal arm portion 118 and seal face 120 can move axially with respect to axial direction A towards or away from the rotating component 106. The axial direction A is along or parallel to the axis of rotation 110.

The resilient member 122 of seal assembly 600 is disposed between the radially outer surface 160 of the seal body 114 and the stationary extension arm 162 and extends axial direction A. The resilient member 122 of seal assembly 600 is coupled at one end the stationary extension arm 162 and at another end to the seal body 114. The resilient member 122 can include a spring or bellows.

The resilient member 122 applies a force on the seal body 114 to hold or bias the seal face 120 toward the stationary extension arm 162 or stationary component 108 and away from a seal surface 124 of the rotating component 106. The stationary arm 112, the stationary extension arm 162, and the seal body 114 can be formed as rings extending around the axis of rotation 110. The stationary arm 112, the stationary extension arm 162, and the seal body 114 can each be a continuous ring or can be formed of segmented parts that each partially extend around the axis of rotation 110.

As illustrated in FIG. 7, the seal body 114 of seal assembly 600 defines inner pocket 172. More particularly, the inner pocket 172 is defined between the crossbar portion 116 and a radially inner arm portion 176 of the seal body 114.

As shown in FIG. 7, the seal body 114 of seal assembly 600 includes or defines a fluid feed passage 126 that extends within and through at least a portion of the seal body 114. In the exemplary embodiment shown in FIG. 7, the fluid feed passage 126 includes inlet 128 defined along radial side wall 178 and in fluid communication with the third-pressure plenum 144 and the inner pocket 172. The fluid feed passage 126 extends within the seal arm portion 118 towards the rotating component 106, and to one or more feed ports 138 or outlet(s) defined along the seal face 120. The fluid feed passage 126 provides or defines a continuous flowpath through the seal body 114 between the inlet 128 and the one or more feed ports 138.

As shown in FIG. 7, seal assembly 600 may further include plenum seal 140. In the embodiment illustrated, the plenum seal 140 is disposed between a portion of the seal body 114, particularly the inner arm portion 176, and a portion of the stationary arm 112 thereby forming a seal therebetween. In exemplary embodiments, the plenum seal 140 may be a piston seal. In this embodiment, the plenum seal 140, the inner pocket 172 of the seal body 114, the stationary arm 112, the inner arm portion 176, and the stationary extension arm 162, at least partially define the third-pressure plenum 144.

The third-pressure plenum 144 receives fluid 146 at high-pressure from the high-pressure fluid source 148 of the core engine 14. The high-pressure fluid source 148 may include one or more of the high-pressure compressor 40, and the high-pressure turbine 42. Fluid 146 is provided to the third-pressure plenum 144 at a greater pressure than both the first-pressure plenum 102 and the second-pressure plenum 104. The third-pressure plenum 144 is in fluid communication with the inlet 128 to the fluid feed passage 126. In this configuration, the fluid feed passage 126 defines a continuous flowpath from the third-pressure plenum 144 to the one or more feed ports 138.

In operation, The resilient member 122 pulls or otherwise biases the seal body 114, particularly the seal face 120, toward the stationary component 108 and away from the seal surface 124 of the rotating component 106. Fluid pressure from the first-pressure plenum 102 can urge or force the seal body 114, particularly the seal face 120 toward the seal surface 124 of the rotating component 106 (e.g., in the axial direction A and opposite to the direction in which the resilient member 122 pulls the seal body 114) because an increased fluid pressure is formed in the first-pressure plenum 102 that is higher than fluid pressure in the second-pressure plenum 104.

As the seal body 114 moves toward the rotating component 106, primary tooth 150 of the rotating component 106 moves close to the secondary sealing surface 152 of the seal body 114, thus reducing an axial gap 154 through which fluid can move from the first-pressure plenum 102 to the second-pressure plenum 104. The fluid allowed to pass through the axial gap 154 forms a film bearing or seal between the primary tooth 150 and the secondary sealing surface 152 of the seal body 114. This bearing or seal can prevent or reduce leakage of fluid from the first-pressure plenum 102 operating at a higher fluid pressure to the second-pressure plenum 104 operating at a lower pressure as compared to the first-pressure plenum.

The fluid 146 from the high-pressure fluid source 148 flows into the third-pressure plenum 144 at a fluid pressure that is higher than both the fluid pressure in the first-pressure plenum 102 and in the second-pressure plenum 104. The fluid 146 flows from the third-pressure plenum 144, into the fluid feed passage 126 via inlet 128, travels through the fluid feed passage 126 and out through the one or more feed ports 138 into fluid cavity 156 defined between the seal face 120 of the seal body 114 and the seal surface 124 of the rotating component 106. Fluid 146 forms the axial fluid film bearing 158 between the seal face 120 of the seal body 114 and the seal surface 124 of the rotating component 106. An axial thickness of this axial fluid film bearing 158 may be on the order of three to six mils, in one embodiment.

Alternatively, the thickness may be smaller than three mils or larger than six mils. The axial separation between the secondary sealing surface 152 of the seal body 114 and the primary tooth 150 can be reduced such that a seal is formed between the seal body 114 and the rotating component 106 at the interface between the secondary sealing surface 152 and the primary tooth 150.

Further aspects are provided by the subject matter of the following clauses:

An aspirating face seal assembly comprises a rotating component defining a seal surface, a stationary component, a seal body defining a seal face, the seal body defining a fluid feed passage within the seal body, wherein the fluid feed passage includes an inlet, and one or more feed ports defined along the seal face, wherein the seal body is moveably coupled to the stationary component via a resilient member, a first-pressure plenum defined radially outward from the seal body, a second-pressure plenum defined radially inward from the seal body, and a plenum seal forming a seal between a portion of the seal body and the stationary component. The plenum seal, the stationary component, and the seal body at least partially define a third-pressure plenum in fluid communication with a high-pressure fluid source, wherein the third-pressure plenum is in fluid communication with the inlet of the fluid feed passage, and wherein the third-pressure plenum is pressurized at a higher pressure than both the first-pressure plenum and the second-pressure plenum.

The aspirating face seal assembly of the previous or any preceding clause, wherein an axial gap is defined between the seal face and the seal surface.

The aspirating face seal assembly of any previous or any preceding clause, wherein the seal body defines a crossbar portion and a seal arm portion.

The aspirating face seal assembly of any previous or any preceding clause, wherein fluid feed passage extends axially within the crossbar portion and radially within the seal arm portion of the seal body between the inlet and the one or more feed ports.

The aspirating face seal assembly of any previous or any preceding clause, wherein the stationary component includes a stationary extension arm, wherein the plenum seal extends from the stationary extension arm to a radially outer surface of the seal body, and wherein the stationary extension arm at least partially defines the third-pressure plenum.

The aspirating face seal assembly of any previous or any preceding clause, wherein the inlet is defined along the radially outer surface of the seal body.

The aspirating face seal assembly of any previous or any preceding clause, wherein the seal body defines a radial side wall, wherein the inlet is defined along the radial side wall.

The aspirating face seal assembly of any previous or any preceding clause, wherein the stationary component includes a stationary arm, wherein the plenum seal extends from the stationary arm to an outer surface of the seal body, and wherein the stationary arm at least partially defines the third-pressure plenum.

The aspirating face seal assembly of any previous or any preceding clause, wherein the seal body defines an inner pocket, wherein the inner pocket at least partially defines the third-pressure plenum.

The aspirating face seal assembly of any previous or any preceding clause, wherein the inlet is defined within the inner pocket.

The aspirating face seal assembly of any previous or any preceding clause, wherein the stationary arm defines a channel extending therein, wherein the channel defines a fluid passage between the high-pressure fluid source and the third-pressure plenum.

The aspirating face seal assembly of any previous or any preceding clause, wherein the resilient member is disposed outside of the inner pocket.

The aspirating face seal assembly of any previous or any preceding clause, further comprising a tube, wherein the tube extends from the seal body into the stationary component, wherein the tube at least partially defines the fluid feed passage including the inlet, and wherein the tube is in fluid communication with the high-pressure fluid source and the fluid feed passage.

The aspirating face seal assembly of any previous or any preceding clause, wherein the plenum seal is slidably engaged with an outer surface of the tube.

The aspirating face seal assembly of any previous or any preceding clause, wherein the stationary component defines a plenum therein, wherein the plenum defines the third-pressure plenum.

The aspirating face seal assembly of any previous or any preceding clause, wherein the rotating component includes a primary tooth and the seal body defines a secondary sealing surface adjacent to the primary tooth.

The aspirating face seal assembly of any previous or any preceding clause, wherein the rotating component is one of a high-pressure shaft and a low-pressure shaft of a gas turbine engine.

The aspirating face seal assembly of any previous or any preceding clause, wherein the high-pressure fluid source is one of a high-pressure compressor, a low-pressure compressor, a compressor discharge, or a high-pressure turbine of a gas turbine engine.

The aspirating face seal assembly of any previous or any preceding clause, wherein the resilient member is a spring or bellows.

The aspirating face seal assembly of any previous or any preceding clause, wherein the resilient member includes a first end coupled to the stationary component and second end coupled to the seal body, wherein the resilient member biases the seal face of the seal body away from the seal surface of the rotating component.

A gas turbine engine comprising, and aspirating face seal assembly of any previous clause.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An aspirating face seal assembly, comprising:
a rotating component defining a seal surface;
a stationary component;
a seal body defining a seal face, the seal body defining a fluid feed passage within the seal body, wherein the fluid feed passage includes an inlet, and one or more feed ports defined along the seal face, wherein the seal body is moveably coupled to the stationary component via a resilient member;
a first-pressure plenum defined radially outward from the seal body;
a second-pressure plenum defined radially inward from the seal body; and
a plenum seal forming a seal between a portion of the seal body and the stationary component, wherein the plenum seal, the stationary component, and the seal body at least partially define a third-pressure plenum in fluid communication with a high-pressure fluid source, wherein the third-pressure plenum is in fluid communication with the inlet of the fluid feed passage, and wherein the third-pressure plenum is pressurized at a higher pressure than both the first-pressure plenum and the second-pressure plenum.

2. The aspirating face seal assembly of claim 1, wherein an axial gap is defined between the seal face and the seal surface.

3. The aspirating face seal assembly of claim 1, wherein the seal body defines a crossbar portion and a seal arm portion.

4. The aspirating face seal assembly of claim 3, wherein the fluid feed passage extends axially within the crossbar portion and radially within the seal arm portion of the seal body between the inlet and the one or more feed ports.

5. The aspirating face seal assembly of claim 1, wherein the stationary component includes a stationary extension arm, wherein the plenum seal extends from the stationary extension arm to a radially outer surface of the seal body, and wherein the stationary extension arm at least partially defines the third-pressure plenum.

6. The aspirating face seal assembly of claim 5, wherein the inlet is defined along the radially outer surface of the seal body.

7. The aspirating face seal assembly of claim 5, wherein the seal body defines a radial side wall, wherein the inlet is defined along the radial side wall.

8. The aspirating face seal assembly of claim 1, wherein the stationary component includes a stationary arm, wherein the plenum seal extends from the stationary arm to an outer surface of the seal body, and wherein the stationary arm at least partially defines the third-pressure plenum.

9. The aspirating face seal assembly of claim 8, wherein the seal body defines an inner pocket, wherein the inner pocket at least partially defines the third-pressure plenum.

10. The aspirating face seal assembly of claim 9, wherein the inlet is defined within the inner pocket.

11. The aspirating face seal assembly of claim 9, wherein the stationary arm defines a channel extending therein, wherein the channel provides for fluid communication between the high-pressure fluid source and the third-pressure plenum.

12. The aspirating face seal assembly of claim 9, wherein the resilient member is disposed outside of the inner pocket.

13. The aspirating face seal assembly of claim 1, further comprising a tube, wherein the tube extends from the seal body into the stationary component, wherein the tube at least partially defines the fluid feed passage including the inlet, and wherein the tube is in fluid communication with the high-pressure fluid source and the fluid feed passage.

14. The aspirating face seal assembly of claim 13, wherein the plenum seal is slidably engaged with an outer surface of the tube.

15. The aspirating face seal assembly of claim 13, wherein the stationary component defines a plenum therein, wherein the plenum defines the third-pressure plenum.

16. The aspirating face seal assembly of claim 1, wherein the rotating component includes a primary tooth, and the seal body defines a secondary sealing surface adjacent to the primary tooth.

17. The aspirating face seal assembly of claim 1, wherein the rotating component is one of a high-pressure shaft and a low-pressure shaft of a gas turbine engine.

18. The aspirating face seal assembly of claim 1, wherein the high-pressure fluid source is one of a high-pressure compressor, a low-pressure compressor, a compressor discharge, or a high-pressure turbine of a gas turbine engine.

19. The aspirating face seal assembly of claim 1, wherein the resilient member is a spring or bellows.

20. The aspirating face seal assembly of claim 1, wherein the resilient member includes a first end coupled to the stationary component and second end coupled to the seal body, wherein the resilient member biases the seal face of the seal body away from the seal surface of the rotating component.

* * * * *